United States Patent [19]

Giesecke et al.

[11] Patent Number: 4,572,308

[45] Date of Patent: Feb. 25, 1986

[54] METHOD FOR CONSTRUCTING A WEIGHBRIDGE AND WEIGHING CELL ASSEMBLY, IN PARTICULAR FOR USE IN PERFORMING THE METHOD

[75] Inventors: Peter Giesecke, Seeheim/Stettbach; Johann Feith, Roedermark, both of Fed. Rep. of Germany

[73] Assignee: Firma Carl Schenck AG, Darmstadt, Fed. Rep. of Germany

[21] Appl. No.: 607,941

[22] Filed: May 7, 1984

[51] Int. Cl.⁴ .............................................. G01G 19/02
[52] U.S. Cl. ......................................... 177/1; 177/134
[58] Field of Search ............................ 177/134, 135, 1

[56] References Cited

U.S. PATENT DOCUMENTS

| 2,838,299 | 6/1958  | Reiser et al. |         |
|-----------|---------|---------------|---------|
| 3,266,585 | 8/1966  | Boadle        | 177/134 |
| 3,770,068 | 11/1973 | Ahl           | 177/134 |
| 4,392,537 | 7/1983  | Lundborg      | 177/134 |

FOREIGN PATENT DOCUMENTS

| 82/105817.9 | 6/1982  | European Pat. Off. |
|-------------|---------|--------------------|
| 97734       | 11/1984 | European Pat. Off. |
| 1214428     | 10/1966 | Fed. Rep. of Germany |
| 2244912     | 9/1972  | Fed. Rep. of Germany |
| 464524      | 3/1914  | France |
| 2076978     | 12/1981 | United Kingdom |

*Primary Examiner*—George H. Miller, Jr.
*Attorney, Agent, or Firm*—W. G. Fasse; D. H. Kane, Jr.

[57] ABSTRACT

In a method for constructing a weighbridge, the weighing platform is made of reinforced concrete and is built in a previously prepared foundation ditch which is used as a mold for the weighing platform. After the hardening of the foundation ditch (1) separating means (10, 11) are placed in the foundation ditch (1) for separating the weighing platform from the ditch (1). Subsequently, the weighing platform is cast in the foundation ditch (1). A weighing cell assembly for a weighbridge, which is particularly suitable for use when performing this method, includes a weighing cell, a support element (6) for the weighing cell and a tubular structural member (8) which can be connected to the weighing platform and holds the support element (6). The weighing platform can be supported on the weighing cell through the tubular structural member.

7 Claims, 5 Drawing Figures

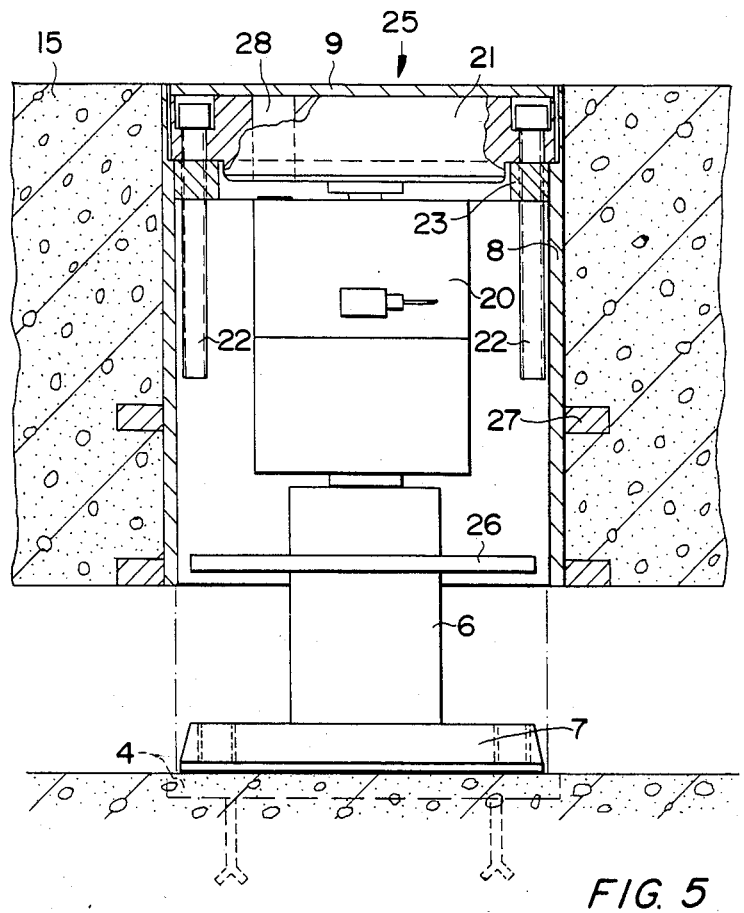

METHOD FOR CONSTRUCTING A WEIGHBRIDGE AND WEIGHING CELL ASSEMBLY, IN PARTICULAR FOR USE IN PERFORMING THE METHOD

FIELD OF THE INVENTION

The invention relates to a method for constructing a weighbridge, wherein the weighing platform is made of reinforced concrete and is built in a previously prepared foundation ditch for the bridge, and wherein the connecting or bearing elements for the weighing cells are cast into the weighing platform, as well as to a weighing cell assembly, in particular for use when performing the method.

DESCRIPTION OF THE PRIOR ART

With a known weighbridge the weighing platform is made of prefabricated prestressed concrete parts (German Offenlegungsschrift No. 2,244,912). The weighing platform is penetrated by openings, through which the weighing cells, on which the platform rests, are accessible from the top. Such a bridge construction is suitable mainly for the mass production of the bridge or platform elements in a factory.

With another known weighbridge of steel construction (German Patent Specification No. 1,214,428), when erecting the weighbridge, the weighing platform is first of all set in the prepared foundation ditch. Subsequently, the weighing cells are mounted on the foundation from the top between frame members of the platform, and then the platform is supported on the weighing cells by way of intermediate members and bearing elements with the aid of pressure screws. Weighbridges with steel platforms require substantial manufacturing expenditure and are, therefore, relatively expensive.

According to European Patent Publication No. 82/105817.9 the weighing platform of a weighbridge for road vehicles may be cast in the foundation ditch with the aid of special dead form elements. Premanufactured form elements are required for this, which are assembled in the foundation ditch and which after the casting of the weighing platform remain on the platform body. The connecting and bearing elements for the weighing cells are cast into the platform.

OBJECTS OF THE INVENTION

It is the main object of the present invention to simplify and improve the construction of a weighbridge with a weighing platform made of reinforced concrete, which is cast in a foundation ditch. Expensive formwork is to be avoided with this or only simple form elements should be required. With embodiments of the invention a simple erecting of the weighing cells should be possible without special hoisting equipment being required.

SUMMARY OF THE INVENTION

Said main object is achieved according to the invention by a method for constructing a weighbridge, wherein the weighing platform is made of reinforced concrete and is built in a previously prepared foundation ditch for the bridge, the connecting or bearing elements for the weighing cells are cast into the weighing platform, and the foundation ditch is used as the mold for the weighing platform after the hardening of the foundation ditch separating means are placed in the foundation ditch for separating the weighing platform from the foundation ditch, and subsequently the weighing platform is cast in the foundation ditch.

The other claims relate to embodiments of the invention, amongst others a weighing cell assembly, which can in particular be used in an advantageous manner for performing the claimed method.

Advantages of the invention are seen in that a shallow weighbridge ditch may be used, in the simple construction of the weighing platform, even at remote sites, and in that no alignment or adjusting work is required on the weighing platform.

BRIEF FIGURE DESCRIPTION

In order that the invention may be clearly understood, it will now be described, by way of example, with reference to the accompanying drawings, wherein:

FIG. 5 is a section through a weighing cell assembly with the weighing platform resting on the weighing cell in the operative position.

DETAILED DESCRIPTION OF PREFERRED EXAMPLE EMBODIMENTS AND OF THE BEST MODE OF THE INVENTION

Figure 1:
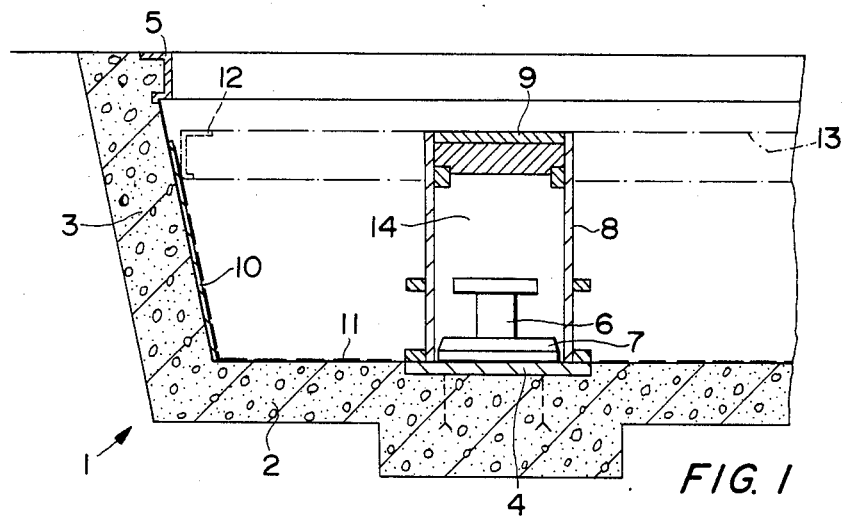
FIG. 1 is a section of a foundation ditch for a weighing platform with parts of a weighing cell assembly.

FIG. 1 shows part of a foundation ditch 1 for a weighing platform which has not been illustrated in the drawing. Together with the weighing platform, which will still be described in the following, and with other indicating, recording and control devices, etc. that have not been illustrated, the ditch forms a weighbridge for, for example, road vehicles.

The foundation ditch 1 has a bottom 2 and side and end walls 3. The side and end walls of the foundation ditch 1 diverge slightly upwardly, i.e., the ditch has a shape that tapers down toward the bottom 2. As a result thereof, a weighing platform that has been cast in the foundation ditch, can after the casting easily be removed from the foundation ditch which acts as a mold. The slanting side walls ensure that, when the weighing platform has been raised (see FIG. 4), the required play between the foundation and the outer lateral contour of the weighing platform is obtained. The ditch walls may also be vertical when suitable form elements are used for the sides of the weighing platform.

When making the foundation, foundation plates 4 for receiving the weighing cells are concreted into the bottom 2 of the ditch, the weighbridge being provided, for example, with four weighing cells and foundation plates respectively. Furthermore, the ditch foundation may have a ditch-surround or an enclosing frame 5, which is also cast in during the preparation of the foundation. The ditch-surround may also be different from that illustrated in the drawing.

After the foundation has set, a support element 6 for a weighing cell is fastened onto each foundation plate 4, for example by means of screws. The support element 6 is provided on its base with a centering element 7 for a tubular structural member 8. After the support element 6 has been fastened, the tubular structural member 8 which, for example, may be a steel structural member, is placed on the foundation plate 4, being fixed in position by the centering element 7. The tubular structural member 8, the height of which corresponds to the height of the weighing platform to be cast and which serves to form an opening 14 through the weighing platform, is closed off at the top by a cover 9, so that during the casting of the weighing platform no casting material can get into the opening of the tubular structural member.

After all bearing points for the weighing platform have been provided with the support elements 6 and the tubular structural members 8, separating elements for separating the weighing platform to be cast from the bottom 2 and the side walls 3 of the foundation ditch 1 are put in. Here one may, for example, use form panels 10 or separating foils 11 or other suitable separating means. To shape the underside of the weighing platform also displacement parts may be put in (see FIGS. 2 and 4). The form elements and the displacement parts may, if need be, also remain firmly connected to the weighing platform after the casting, either as a whole or partially. Then the reinforcing or the bearing reinforcing of the weighing platform (not illustrated) as well as of the bridge frame 12 is still put into the foundation ditch and fixed in position in a suitable manner.

After the preparation work, the weighing platform is cast in the foundation ditch 1. The top edge of the completed weighing platform is indicated in the drawing by the reference numeral 13. When using the method according to the invention, the outer lateral shape or the lateral contour of the weighing platform corresponds substantially to the inside shape of the foundation ditch. As a result thereof, the requirements in respect of the accuracy when preparing the foundation ditch are considerably less than in the case of prefabricated weighing platforms, since during the casting in the ditch the weighing platform is adapted to the shape of the ditch and the required play between the ditch and weighing platform in the operative position of the weighing platform is ensured automatically.

Figure 2:
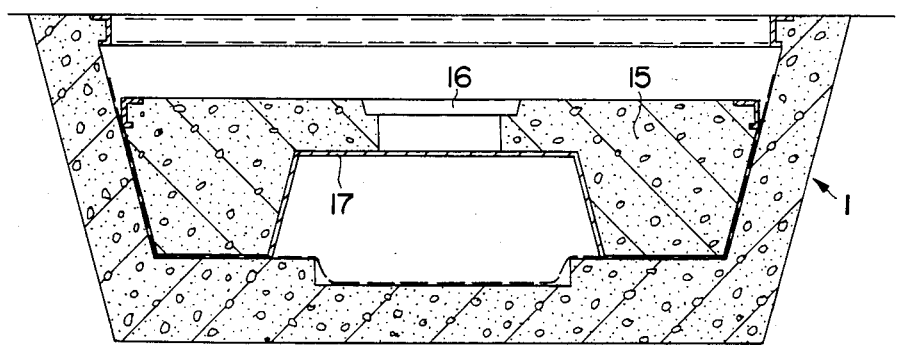
FIG. 2 is a cross-section through a foundation ditch for a weighbridge and a weighing platform cast in the ditch.

FIG. 2 shows the foundation ditch 1 with the ready cast weighing platform 15 in a cross-section which does not pass through the weighing cell assemblies. For example, as shown in the drawing, access openings 16 may be provided on the weighing platform. The contour of the underside of the weighing platform may be determined by displacement parts 17, which may also remain attached to the weighing platform.

Figure 3:
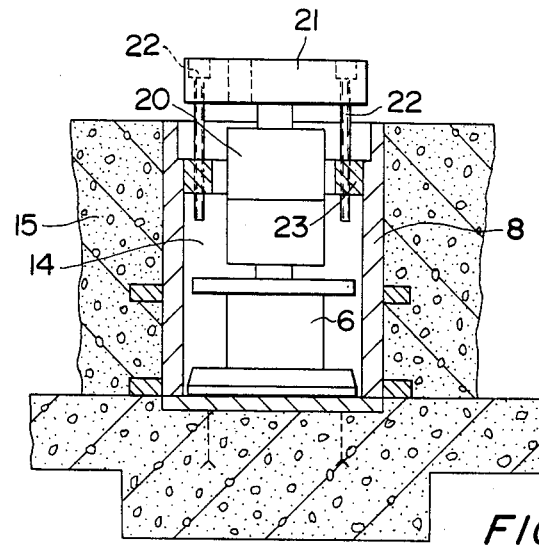
FIG. 3 is a cross-section through a weighing cell assembly in the installed state before raising the weighing platform.

After the setting and hardening of the weighing platform, the weighing cells may be installed from the top. To do so, first of all, the covers 9 of the tubular structural members 8 are removed. Then the weighing cell 20 is placed on the support element 6 from the top through the opening 14 formed by the tubular structural member 8, and is aligned with the aid of a support flange 21 and fixed in position by tension bolts 22 (FIG. 3). The weighing cell 20 at the top rests against the support flange 21, which by means of the tension bolts 22 can be tightened onto an annular flange 23. The tension bolts 22 can be arranged sunk in the support flange 21. The tension bolts 22 have a double function: they serve to raise the weighing platform and in the installed state they act as fastening bolts.

Figure 4:
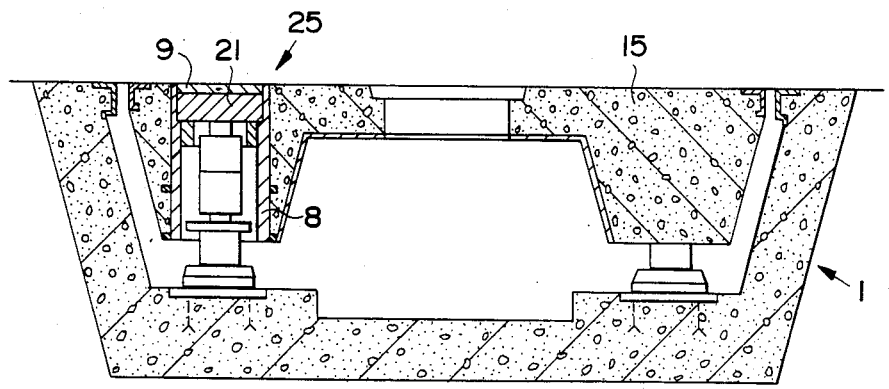
FIG. 4 is a cross-section through a weighbridge with weighing cell assembly in the operative position.

After all weighing cells 20 have been mounted on the weighbridge in the described manner, the weighing platform 15 is slowly raised by a uniform tightening of the tension bolts 22 on the individual bearing points or weighing cells. The raising is completed and the weighing platform 15 is in the operative position when the support flanges 21 rest against the annular flanges 23. This state is illustrated in FIG. 4. The tubular structural member 8 can be closed off flush with the surface of the weighing platform 15 by the cover 9, which is fastened to the support flange 21 in a suitable manner, e.g., by screws.

FIG. 5 illustrates further details of the weighing cell assembly 25. The assembly consists of the support element 6 for the weighing cell, which is fastened on the foundation plate 4, the weighing cell 20, the tubular structural member 8, the support flange 21 with the bolts 22 and the cover 9.

Arranged on the base of the support element 6 is the centering part 7 for the tubular structural member 8. The support element 6 furthermore has a shock absorber arrangement, which may be provided, for example, in the shape of an annular flange 26. The flange may also be elastic or may comprise elastic parts. The shock absorber arrangement cooperating with the annular structural member 8 forms a simple and all around protection of the weighing cell against an over-stressing by transverse forces.

The tubular structural member 8 is provided on the outside with elements 27 for anchoring it in the weighing platform. The elements may be provided, for example, in the form of external ribs, as illustrated, or may have another suitable shape. The anchoring elements may also be fastened to the reinforcing of the weighing platform 15.

On the inside of the tubular structural member 8 one can note the annular flange 23 connected to the structural member, which is provided along its periphery with a suitable number of threaded holes for receiving the tension bolts 22. The dead weight of the weighing platform and the working load are transmitted to the weighing cell 20 by way of the annular flange 23, the tension bolts 22 and the support flange 21.

The support flange 21 comprises at least one through-opening 28, through which, for example, the identification plate of the built-in weighing cell can be inspected and checked.

The weighing cell assembly 23 constitutes a compact unit, which can be used on site as well as for weighing platforms in prefabricated constructions. The unit also acts as a shock absorber, for which with the previously known arrangements special structural parts were required. The assembly serves not only to support the weighing cells, but also to raise the weighing platform after the casting, so that, when using this assembly, no special hoisting equipment is required at the site of installation.

Incidentally, the weighing cell assemblies 25 are also advantageously suitable for use in weighbridges installed above floor level and which weighbridges are cast directly at the installation location.

Although the invention has been described with reference to specific example embodiments, it will be appreciated that it is intended to cover all modifications and equivalents within the scope of the appended claims.

What is claimed is:

1. A method for constructing a weighbridge, wherein the weighing platform is made of reinforced concrete and is built in a previously prepared foundation ditch for the bridge, and wherein the connecting or bearing elements for the weighing cells are cast into the weighing platform, comprising the following steps: using said foundation ditch (1) as a mold for casting said weighing platform (15), after the hardening of the foundation ditch (1) placing separating means (10, 11) into said foundation ditch for separating said weighing platform (15) from the foundation ditch (1), and then casting said weighing platform (15) in the foundation ditch (1).

2. The method of claim 1, further comprising using as said separating means form panels, plates or similar form elements (10), or separating foils (11) or other suitable separating means for separating said weighing platform from the foundation ditch (1).

3. The method of claim 1, further comprising providing through-openings (14) in the weighing platform (15), placing, after the construction and hardening of the weighing platform (15), weighing cells (20) from the top through said through-openings (14) onto support elements (16) on the bottom (2) of the foundation ditch, and subsequently raising and supporting said weighing platform (15) on said weighing cells (20) through connecting or bearing elements.

4. The method of claim 3, further comprising producing said through-openings (14) with the aid of tubular structural members (8), which have about the same height as the weighing platform (15) and which are concreted or embedded into the weighing platform during the construction thereof.

5. The method of claim 4, further comprising, fastening, prior to the construction of the weighing platform (15), support elements (6) for the weighing cells (20) onto foundation plates (4) cast into the bottom (2) of the foundation ditch, and placing said tubular structural members (8) on the foundation plates (4) for enclosing the support elements (6) for the weighing cells (20), and fixing said structural members (8) in position by centering parts (7) on the support elements (6).

6. The method of claim 1, further comprising casting foundation plates (4) for support elements (6) of the weighing cells (20) and a ditch-surround (5), during the construction of the foundation ditch (1).

7. The method of claim 1, further comprising constructing said foundation ditch (1) to have a shape tapering slightly downwardly toward the bottom (2) of the ditch, said foundation ditch being deeper than the height of the weighing platform (15), and then casting said weighing platform (15) so that it is resting on the bottom (2) of the ditch.

* * * * *